United States Patent
Moreira Neto et al.

(10) Patent No.: US 9,817,115 B2
(45) Date of Patent: Nov. 14, 2017

(54) WEATHER RADAR SYSTEM

(71) Applicant: BRADAR INDUSTRIA S.A., São José dos Campos-SP (BR)

(72) Inventors: João Roberto Moreira Neto, Valinhos-SP (BR); Marco Antônio Miguel Miranda, Campinas-SP (BR); César Rodrigo Steffens, São José dos Campos-SP (BR)

(73) Assignee: Bradar Industria S.A., San Jose dos Campos (BR)

( * ) Notice: Subject to any disclaimer, the term of this patent is extended or adjusted under 35 U.S.C. 154(b) by 472 days.

(21) Appl. No.: 14/407,189

(22) PCT Filed: Jun. 11, 2013

(86) PCT No.: PCT/BR2013/000204
§ 371 (c)(1),
(2) Date: Dec. 11, 2014

(87) PCT Pub. No.: WO2013/185195
PCT Pub. Date: Dec. 19, 2013

(65) Prior Publication Data
US 2015/0177377 A1 Jun. 25, 2015

(30) Foreign Application Priority Data
Jun. 11, 2012 (BR) .......................... 1020120139561

(51) Int. Cl.
*G01S 13/95* (2006.01)
*G01S 13/42* (2006.01)
(Continued)

(52) U.S. Cl.
CPC ............ *G01S 13/95* (2013.01); *G01S 13/426* (2013.01); *G01S 13/9035* (2013.01);
(Continued)

(58) Field of Classification Search
CPC .... G01S 13/95; G01S 13/9035; G01S 13/426; G01S 13/951; G01S 2013/9082;
(Continued)

(56) References Cited

U.S. PATENT DOCUMENTS 4,143,378 A * 3/1979 Darrouzet .............. H01Q 1/005
342/368
4,224,618 A * 9/1980 Rich ........................ G01S 7/20
342/180

(Continued)

FOREIGN PATENT DOCUMENTS

| BR | 102012013956 A2 * | 4/2014 | .......... G01S 13/426 |
| WO | 2000/43807 A1 | 7/2000 | |
| WO | 2000/43808 A1 | 7/2000 | |

*Primary Examiner* — John B Sotomayor
(74) *Attorney, Agent, or Firm* — Ladas & Parry LLP (57) ABSTRACT

Weather radar system which uses antennas constituted by the elongated aperture of waveguides, and form at least an array (510, 520) mounted on a rotating horizontal (502), and the said apertures are as wide as one wavelength (λ) and length higher than 20λ, wherein the small aperture in azimuth ranges from 0.5° to 2° and is synthesized by high rotational speeds together with signal processing techniques such as ROSAR.

5 Claims, 5 Drawing Sheets

(51) Int. Cl.
*G01W 1/02* (2006.01)
*G01S 13/90* (2006.01)
*H01Q 3/08* (2006.01)
*H01Q 13/20* (2006.01)
*H01Q 21/00* (2006.01)

(52) U.S. Cl.
CPC ............ *G01S 13/951* (2013.01); *G01W 1/02* (2013.01); *G01S 2013/9082* (2013.01); *H01Q 3/08* (2013.01); *H01Q 13/20* (2013.01); *H01Q 21/0056* (2013.01)

(58) Field of Classification Search
CPC ....... G01W 1/02; H01Q 3/08; H01Q 21/0056; H01Q 13/20
See application file for complete search history.

(56) References Cited

U.S. PATENT DOCUMENTS

| | | | | |
|---|---|---|---|---|
| 4,297,708 | A * | 10/1981 | Vidal | H01Q 3/46 343/754 |
| 4,353,073 | A * | 10/1982 | Brunner | H01Q 19/138 342/368 |
| 4,538,150 | A * | 8/1985 | Bone, Jr. | G01S 7/4021 342/123 |
| 4,649,389 | A * | 3/1987 | Taylor, Jr. | G01S 13/424 342/123 |
| 4,951,059 | A * | 8/1990 | Taylor, Jr. | G01S 13/424 342/147 |
| 5,066,956 | A * | 11/1991 | Martin | G01S 13/426 342/154 |
| 5,093,649 | A * | 3/1992 | Johnson | G01S 7/2813 342/147 |
| 5,130,712 | A * | 7/1992 | Rubin | G01S 13/951 340/949 |
| 5,392,047 | A | 2/1995 | Klausing | |
| 5,471,211 | A * | 11/1995 | Randall | G01S 13/003 342/26 D |
| 5,510,796 | A * | 4/1996 | Applebaum | H01Q 3/26 342/159 |
| 5,583,972 | A * | 12/1996 | Miller | G01S 13/951 324/640 |
| 5,614,907 | A * | 3/1997 | Kreitmair-Steck | G01C 15/14 342/179 |
| 6,018,307 | A * | 1/2000 | Wakayama | G01S 13/87 342/179 |
| 6,377,204 | B1 * | 4/2002 | Wurman | G01S 13/003 342/147 |
| 6,480,168 | B1 * | 11/2002 | Lam | H01Q 1/1235 343/805 |
| 6,856,273 | B1 * | 2/2005 | Bognar | G01F 1/66 342/26 D |
| 6,982,680 | B2 * | 1/2006 | Janoschka | H01Q 1/1242 343/878 |
| 7,218,279 | B2 * | 5/2007 | Salmivaara | H01Q 21/061 342/117 |
| 7,248,210 | B2 * | 7/2007 | Bruce | G01S 7/02 342/118 |
| 7,365,674 | B2 * | 4/2008 | Tillotson | G01W 1/00 342/115 |
| 8,018,374 | B2 * | 9/2011 | Imai | G01S 7/03 342/11 |
| 8,319,678 | B2 * | 11/2012 | Weiss | G01S 13/003 342/175 |
| 8,451,165 | B2 * | 5/2013 | Puzella | G01S 7/032 342/13 |
| 8,803,726 | B2 * | 8/2014 | Heilmann | G01S 13/424 342/26 D |
| 8,890,757 | B1 * | 11/2014 | Macy | H01Q 1/125 343/713 |
| 2005/0128126 | A1 * | 6/2005 | Wolframm | G01S 13/9023 342/25 R |
| 2005/0253748 | A1 * | 11/2005 | Brookner | G01S 13/426 342/74 |
| 2011/0006961 | A1 * | 1/2011 | Bongfeldt | H01Q 1/1242 343/773 |
| 2011/0285605 | A1 * | 11/2011 | Angseryd | H01Q 1/1242 343/879 |
| 2013/0201076 | A1 * | 8/2013 | Vos | H01Q 21/061 343/879 |

* cited by examiner

WEATHER RADAR SYSTEM

RELATED APPLICATION

This application is a national phase entry under 35 USC 371 of International Patent Application No PCT/BR2013/000204 filed on 11 Jun. 2013, which was published on 19 Dec. 2013 with International Publication Number WO 2013/185195A1, which claims priority from Brazilian Patent Application No. BR 1020120139561 filed on 11 Jun. 2012, the disclosures of which are incorporated in their entirety by reference herein.

FIELD OF THE INVENTION

The present invention refers to a sky imaging and observation system to detect, localize, identify and classify weather phenomena. This system is a radar (Radio Detection And Ranging) which uses the Rotor Synthetic-aperture radar (ROSAR, Rotor-SAR) technique, in Portuguese "Radar de Abertura Sintética com Antenas Rotativas", whereby the narrow beam characteristics normally provided by conventional large antennas are synthesized by means of small size antennas operating at high rotational speeds.

OVERVIEW OF THE STATE OF THE ART

The systems and processes of the radar type applied in meteorology existing in the market and for the observation of weather phenomena using real aperture antenna use an antenna real aperture (or sensor) or electronic scanning to obtain a good azimuth resolution. These devices allow the determination of the position, the radial speed (in the direction of propagation of radar signals) and estimate the degree of wind turbulence, due to the analysis of structures such as rain, clouds, snow, hail, among others. By these observations we can classify the type of particles which constitute each phenomenon and, thus, foresee the degree of severity of a storm, for example.

U.S. Pat. No. 7,365,696 Multitransmitter RF Rotary Joint Free Weather Radar System describes a system which comprises a pedestal 100 leaning on a base 30 (which can be a vehicle) having a platform 120 rotationally secured to the said pedestal and one antenna 200 integral to the platform which is electrically coupled with an electronic subsystem 400 and a signal analysis subsystem. A coherent transmitter generates RF signals which are modulated by the said subsystem in order to create two waves 10, 20 which are radiated by the antenna. The reflected pulses 40, 50 are captured by the antenna and analyzed by the analysis subsystem.

Some of the drawbacks of the solution existing in the market are the use of one large antenna, which is parabolic for mechanical scanning, and rectangular in electronic scanning. Scanning the entire sky, towards the azimuth (360°) and towards the elevation, is slow and, depending on the desired discretization may attain tens of minutes at worst. Furthermore, a transmitter with pick power in the order of kilowatts is needed. Hence, for instance, in the case described in the said U.S. Pat. No. 7,365,696 the transmitter power is of the order of 30 kW.

These characteristics raise the implementation costs such a device. Therefore there is the need for a simplified low-cost solution to determine the position, speed and classification of the weather phenomena.

OBJECTIVES OF THE INVENTION

In view of the foregoing, the present invention has the objective of promote a low-cost radar system which can determine the position, speed and classification of weather phenomena.

Another objective is that of providing a short-range radar system capable of providing short-term forecasts, i.e., detecting and foreseeing storms formed in a short time, in the order of minutes.

BRIEF DESCRIPTION OF THE INVENTION

The objectives above and others are attained by the present invention by the use of an array of N antennas instead of one antenna, in order to reduce the rotational speed N times.

For weather purposes rotational speed has to be high, so that the synthetic aperture is covered by the antenna within the decorrelation time of the particles in the cloud. When N antennas are employed, this speed is reduced N times, achieving values which allow a mechanical construction of acceptable cost.

The antennas may be in the form of waveguides, whose radiating apertures are shaped as narrow openings with openings in the order of one wavelength in the horizontal direction and more than 20 wavelengths in the vertical direction, and said guides are disposed on a rotating platform endowed with a mechanism to modify the angle of the said openings to the vertical direction, wherein the said angle varies between 0 and 90°.

In conformity with another characteristic of the invention, the said array comprises a transmitter antenna, placed in or near the symmetry axis of one or more receiving antennas.

In conformity with another characteristic of the invention, the rotational speed of the said platform ranges between hundreds and thousands of revolutions per minute. If only one receiving antenna was used, the platform would have to rotate at a higher angular velocity in the thousands, so that the target illumination time was shorter than the decorrelation time cloud particle. The target illumination time corresponds to the time to cover the synthetic aperture. However such high rotation speeds are difficult to implement in mechanical devices. Thus, to overcome this problem the present invention uses more than one antenna for receiving the signal, so that the rotation speed decreases by a factor equivalent to the number of receiving antennas used.

In a preferred embodiment of the invention, the said array comprises 4 receiving antennas, and a rotating speed of approximately 5450 rpm. This makes scanning tens or even hundreds of times faster compared to a conventional weather radar, which provides a high refresh rate. Thus, the fast scanning of the radar of the invention makes it a very useful tool in detecting fast-developing rain or turbulence due to the much higher refresh than that of conventional weather radars.

In conformity with another characteristic of the invention, return signal processing introduces a gain in detection, enabling the use of transmitters with a power of the order of tens of watts.

In conformity with another characteristic of the invention, signal processing uses pulse compression in a range to promote a resolution from 15 m to 30 m range and, by ROSAR technology, synthesizes the actual antenna aperture promoting an azimuth resolution from 0.5° to 2°.

This technique allows synthesizing a large antenna by using one or various small antennas in translation. During translation of small antennas data are collected, which will be digitally processed to obtain the large antenna. To make this possible scanning has to be performed in a shorter time than τ, which is known as decorrelation time, that is, a period of time with the following characteristics:

The samples within the period τ has high correlation with each other, i.e., they possess a deterministic relationship of amplitude and phase.

Samples beyond the period τ do not need to be correlated with each other and can be considered statistically independent.

Thus, in order to ensure a successful outcome of the technique the rotating speed, $v_{rpm}$ should be:

$$v_{rpm} \geq \frac{30}{\pi} \frac{\theta}{\tau \cdot N}$$

Wherein é θ is the angular aperture of one of the antennas in radians, N is the number of receiving antennas and τ is the decorrelation time, in seconds, required for the correlation to fall to 2%.

In conformity with another characteristic of the invention, the electromagnetic waves emitted are polarized both horizontally and vertically, thus allowing the post-processing characterization of particles where the signal was reflected.

In conformity with another characteristic of the invention, scanning towards the elevation is provided to the said rotating platform by an integrated mechanism, driven by a motor mechanism, allowing the beam that is narrow in the vertical direction to travel along all elevation angles in a short operating time.

DESCRIPTION OF THE DRAWINGS

The other characteristics and advantages of the invention will be better understood through the description of a preferred embodiment, given by way of illustration and not of limitation, and the figures which refer to it, in which.

DETAILED DESCRIPTION OF THE INVENTION

Figure 1:
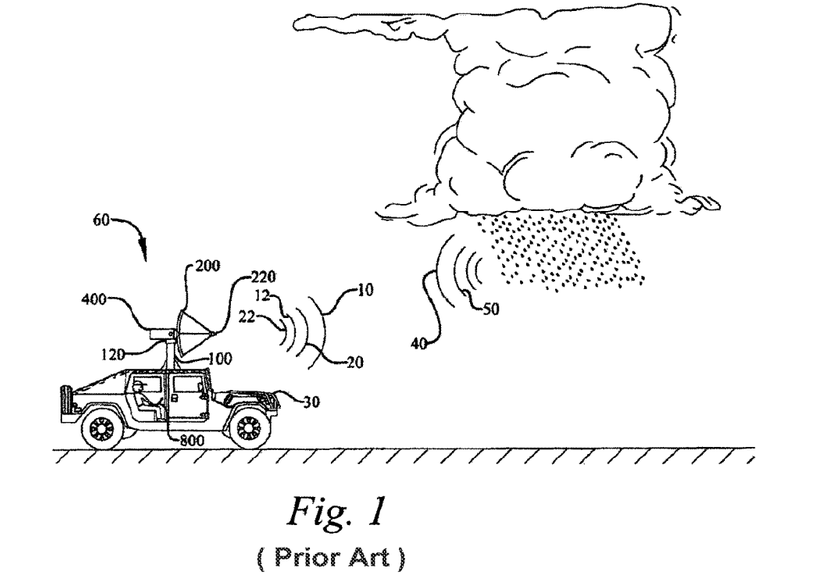
FIG. 1 illustrates weather radar structured in conformity with the state of the art.
Figure 2:
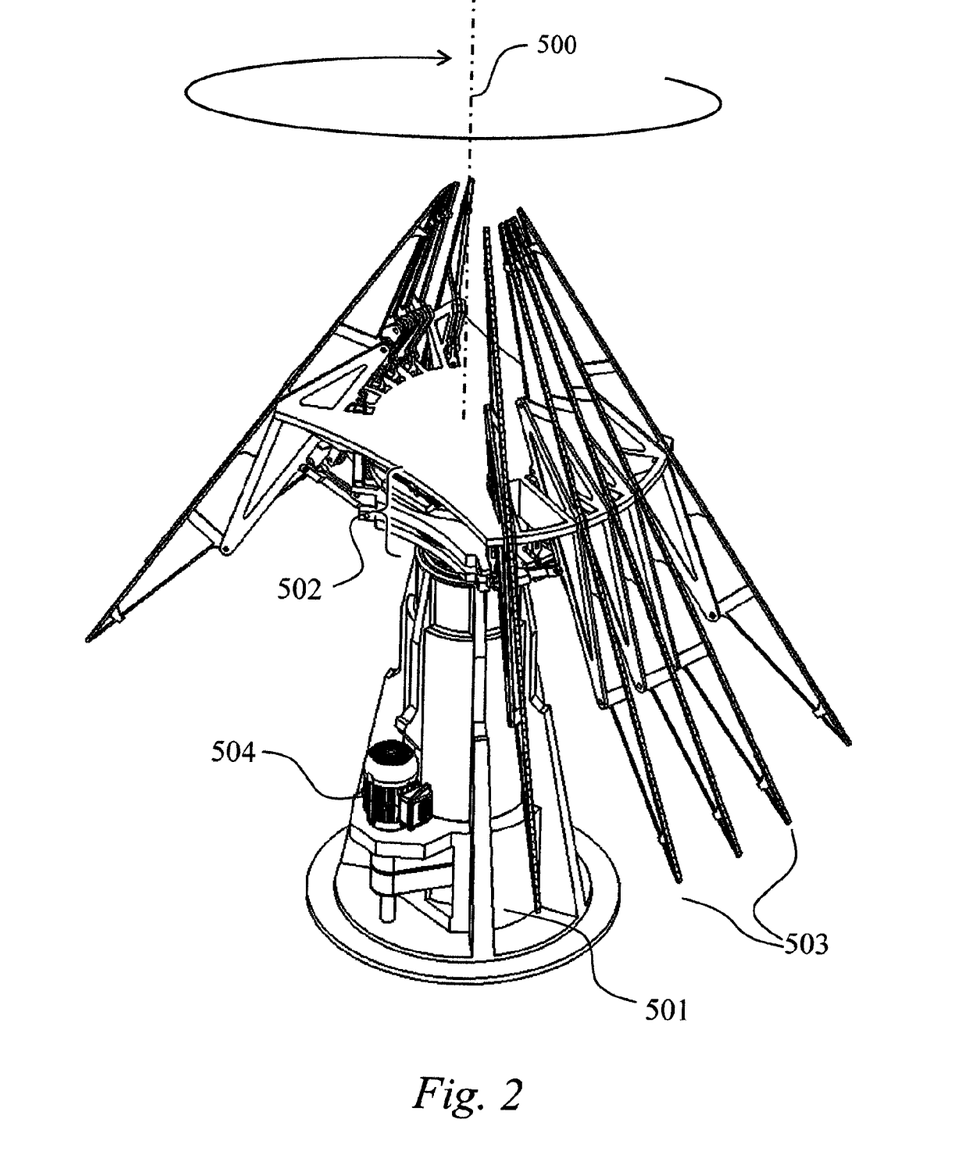
FIG. 2 shows, from a perspective view, the radar built in conformity with the principles of the invention.
Figure 4:
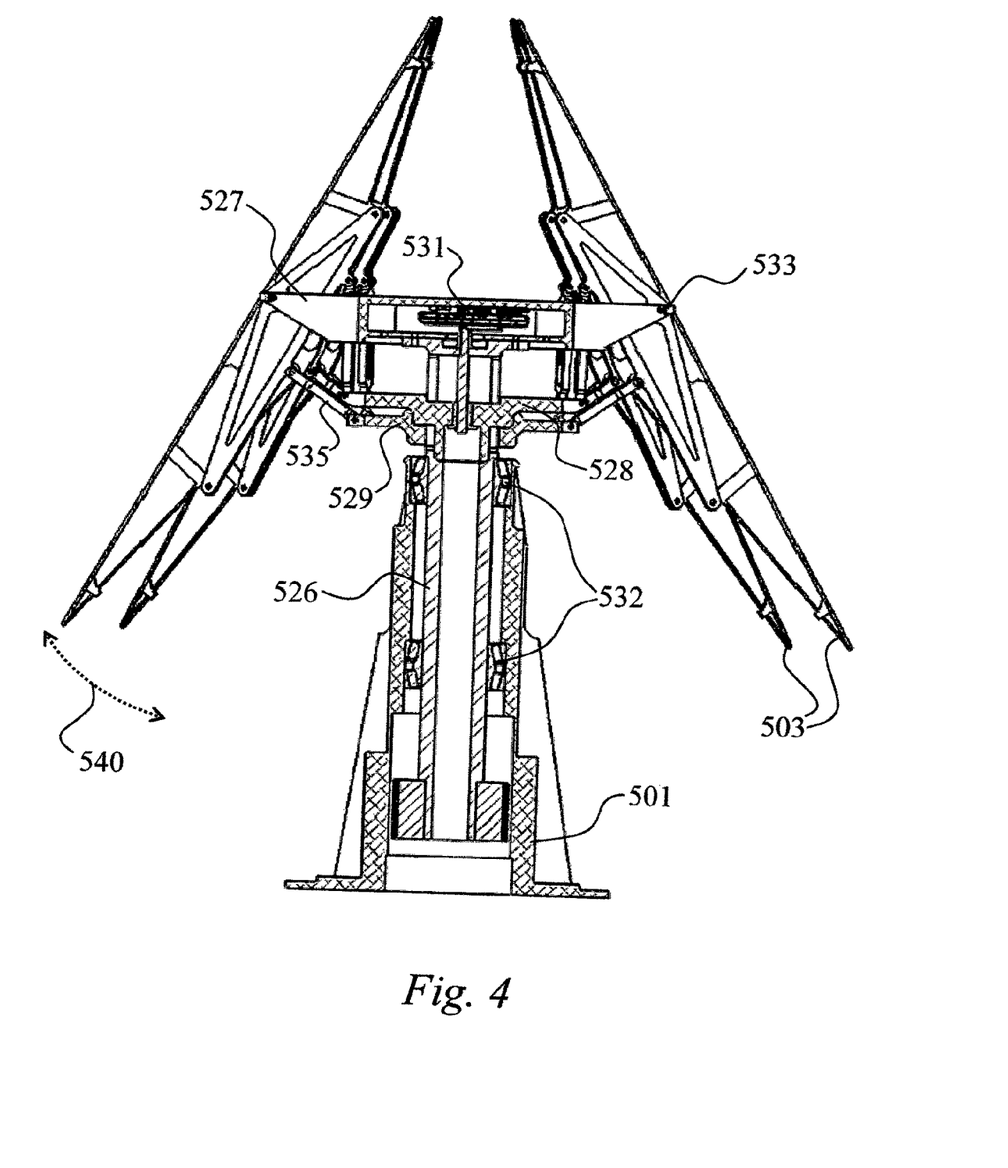
FIG. 4 is a schematic side view of a preferred embodiment of the invention.
Figure 5:
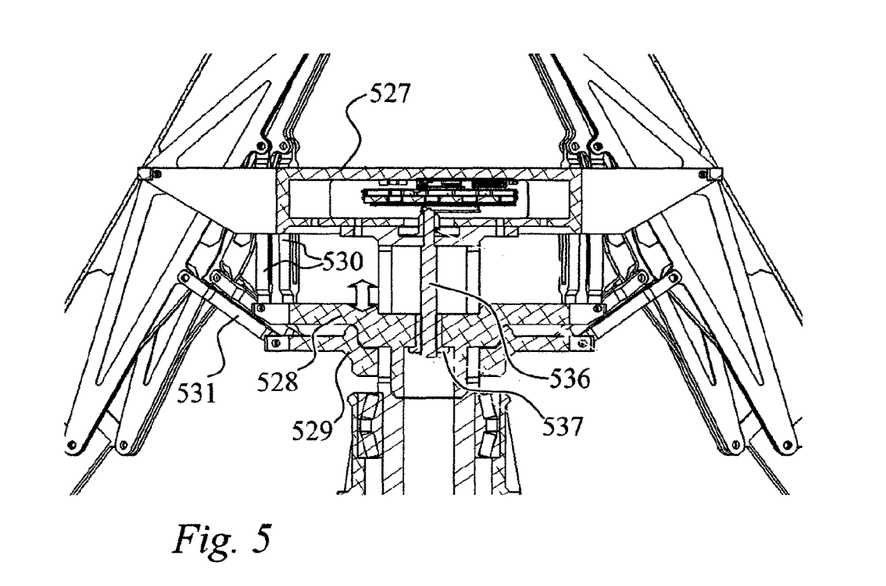
FIG. 5 shows a sectional view of the array, in conformity with the principles of the invention.

Referring now to FIGS. 2, 4 and 5, the invention comprises a base frame 501 shaped in a hollow column within which a spindle 526, supported by two ball bearings 532, is placed and driven by an electric engine 504. At the upper end of this spindle the antenna array 503 is installed which is supported by a complex device comprising three superimposed horizontal platforms 527, 528 and 529, wherein the upper and lower platforms are fixed and the intermediate one vertically slides by the rotation of a ball screw 536 which drives the stem nut 537, integral to the said movable platform 528. According to FIG. 5, drive arms 530 are articulated at their lower end with the platform 528 which, when moving up and down, activates the said arms 530 which, in turn, change the angle 540 between the antennas and the vertical direction. The mechanical system which angularly moves the antennas is driven by an electric engine which is connected directly to the said ball screw through a set of reduction gears, placed in the center of the fixed top platform 527.

Figure 3:
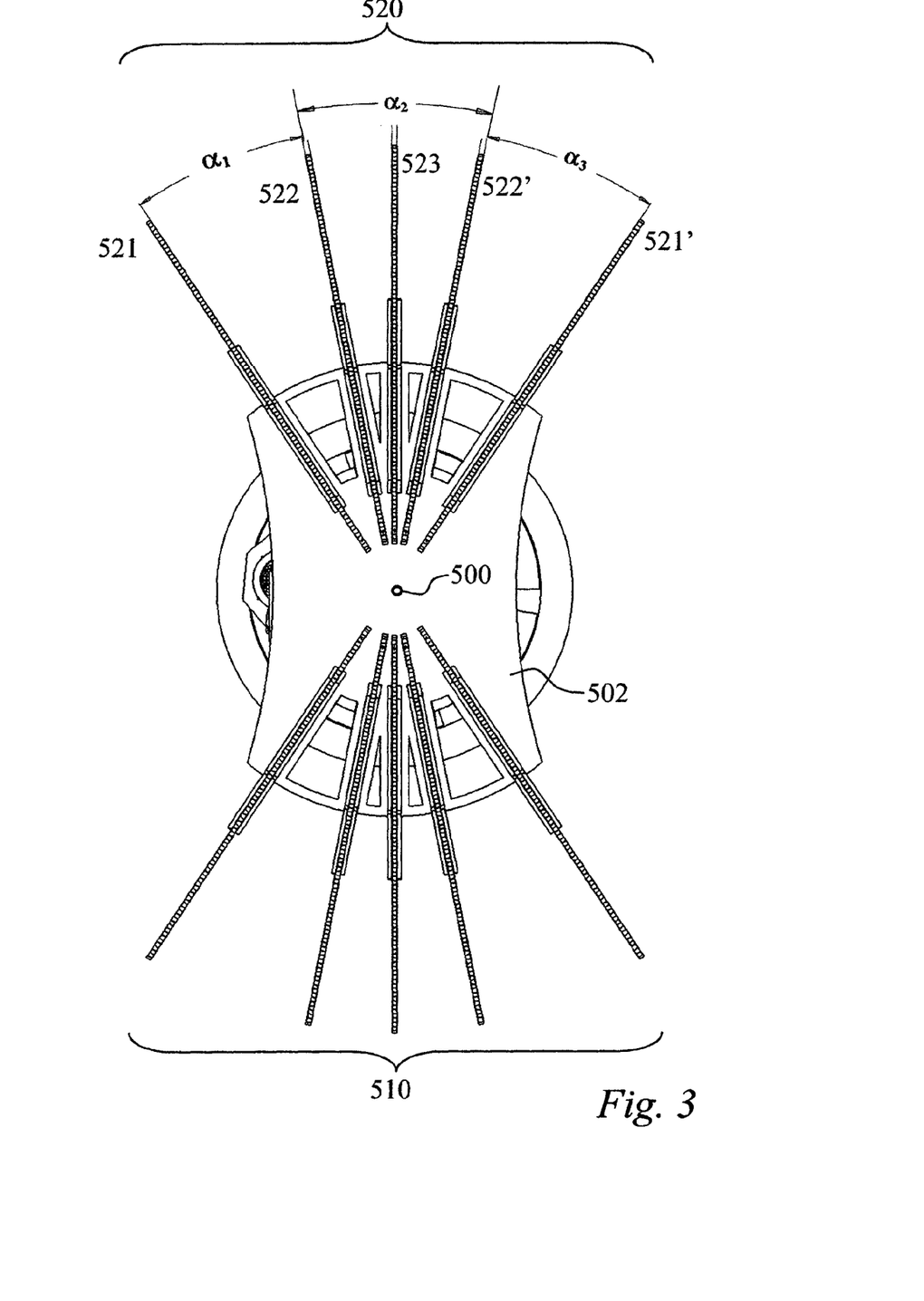
FIG. 3 is a generic schematic top view of the antenna array of the invention.

FIG. 3 illustrates the system of the invention in a top view, which comprises two similar antenna arrays 510 and 520. Although the figure shows the said two arrays, the system may comprise only one of the arrays, for example 520, and the array 510 may be replaced by a counterweight to provide mass balance around the system axis 500. Each array comprises a transmitting antenna 523 and multiples receiving antennas which form an array, as illustrated in FIG. 4, in which the angular distances between the antennas have values of $\alpha_1$, $\alpha_2$ e $\alpha_3$. These angles may be different, although in a preferred embodiment four equally spaced receiving antennas are used, with a preferred spacing of 22.5°. In the same way, the transmitting antenna can occupy any position; however, a central position in the receiving, as illustrated, provides a more uniform illumination of the target. Hence, in the most preferred embodiment of the invention there is a transmitting antenna 523 and four receiving antennas, constituting two pairs of antennas 521-20 52 e 522-522' symmetrically arranged with respect to the said transmitting antenna. Although the illustrations show only one antenna in each position, two juxtaposed antennas are actually used in each position, both in transmission and in reception, one of which is polarized horizontally and the other vertically.

The autocorrelation function R(τ) is given by the following expression [Nathanson, 1969]:

$$R(\tau) = \exp\left[-8\left(\frac{\pi \sigma_v \tau}{\lambda}\right)^2\right]$$

Thus, for the samples to be statistically independent the function above must have a low value which, and for analytical purposes a value of 0.02, that is, 2% is used. Hence the correlation time, in seconds, is given by:

$$\tau \leq 0.222 \frac{\lambda}{\sigma_v}$$

where λ is the wavelength and $\sigma_v$ is a physical parameters representing the standard deviation of the cloud speed, in m/s. In order to synthesize the beam, the distributed target (cloud, rain, etc.) has to be illuminated for a time shorter than τ, since in this way it may be deterministically treated. There are basically two ways to compensate for this limitation of the system: by the rotational speed or by the number of receiving antennas. Thus, the speed necessary for the composition of a large antenna is given by:

$$v_{rpm} \geq \frac{30}{\pi} \frac{\theta}{\tau \cdot N},$$

Where θ is the real antenna aperture towards the azimuth, in radians, and N is the number of receiving antennas used.

Since a very high rotational speed is difficult for mechanic implementation, in the preferred embodiment of the invention multiples antennas are used to reduce this speed.

As observed, the rotational speed is inversely related to the number of antennas. Thus, in the exemplificative embodiment illustrated, this speed is equal to: 1800/4=450 rpm. This makes scanning tens or even hundreds of times faster if compared to a conventional weather radar. The frequency of the pulses is relatively high, being between the 1800 s and 6000 pps. Being a fast-scanning radar, it is important for detecting fast-developing rains. Due to the additional processing that is done towards the range and azimuth, an amplifier with power of the order of tens of watts should be used, which is possible since processing introduces an integration gain to detection.

The present invention uses small antennas, with A cross size of the order of a wavelength—that is, 2.5 cm in the X band—instead of using a real large antenna, and small antennas are placed outside the rotation axis 500 of the radar. On the other hand, the longitudinal size is greater than 20 wavelengths, so as to provide a high resolution in elevation. Thus, for instance, a longitudinal slit size of 30λ results in a resolution of λ/30λ radians, that is, approximately 1°. The signal processing uses pulse compression in ranges to promote a resolution range from 15 m to 50 m. The higher azimuth resolution is provided by the technique for synthesizing the aperture through ROSAR (Rotor Synthetic Aperture Radar) technology, resulting in a value between 0.5° and 2°. (H. Klausing, W. Keydel, Feasibility of a Synthetic Aperture Radar with Rotating Antennas (ROSAR), IEEE International Conference RADAR 1990).

The device works through the emission of electromagnetic, X band signals, although other antenna operating at lower or higher bands may be used. These signals are reflected by the objects to be detected, and the characteristics of these objects such as size, distance and speed changes the characteristics of the reflected signal. The device is touched by these reflections in sensors located in different positions, so these received signals are analyzed in the processing unit of the radar signal which is responsible for handling (sampling and filtering) the signals coming from the receiving chain, detecting the targets of interest, extracting the kinematic information of the targets detected, classifying them and tracking them.

Figure 6:
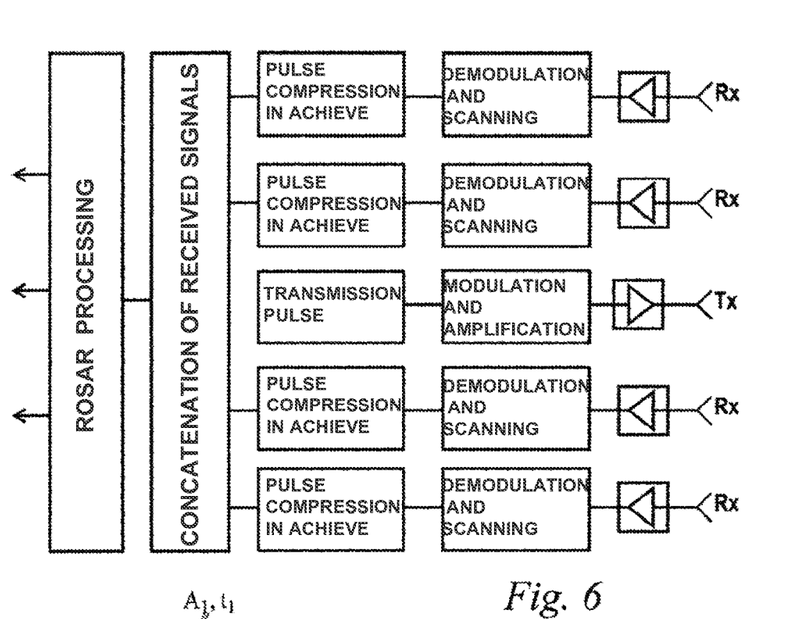
FIG. 6 is a more general block diagram of the system, in conformity with the basic principles of the invention.

FIG. 6 is a simplified schematic diagram of the system in which it is indicated that after the reception of signals and pre-processing, such as filtering and demodulation, signals are processed to obtain data on the detected objects. At the beginning of the processing a technique of pulse compression in range is used, which is quite common in Radar Systems and aims at increasing the resolution in range given by Eq.01, below, and improving the signal-noise ratio. It consists of transmitting a pulse, which is the reference function, with a sufficiently large bandwidth to achieve the resolution at the desired distance while transmitting a pulse of long duration so that the transmitted power is distributed over time. In this case, the pulse duration is 25µε.

$$res_{range} = \frac{v_{luz}}{2 * B_{pulse}} \quad \text{Eq. 01}$$

Where:

$V_{light}$=speed of light;

$B_{pulse}$~frequency band

Figures 7A, 7B:
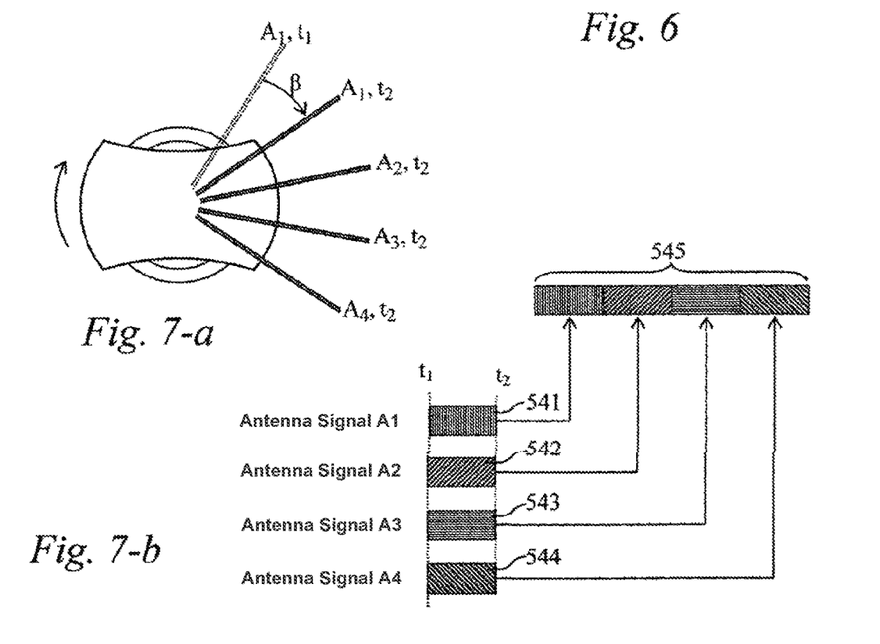
FIG. 7 illustrate the principle of concatenation of the signals captured by the receiving antennas.

Following, the signals of the antennas are concatenated according to the position in which they are received, as outlined in FIGS. 7-*a* and 7-*b*. The first of these samples shows the simultaneous scanning of the target by the four receiving antennas during a rotational displacement of the array of an angle β. Thus, the antenna $A_1$ scans an angle β in the time between $t_1$ and $t_2$, the antenna $A_2$ simultaneously scans the same angle, and the same occurs with antennas $A_3$ and $A_4$. Thus, the signal reflected by the target is sampled at an angle of 4·β during the referred time $t_2$–$t_1$. As indicated in FIG. 7-*b*, the reflected signals 541 . . . 544 captured by the four antennas are concatenated by software, so as to obtain an equivalent signal 545. Afterwards, the ROSAR processing is performed, that is, a narrow antenna aperture is synthesized from a small antenna, although with a relative movement to the target. In order to determine the resolution in azimuth of the system let us note that the effective aperture of the antenna is given by Eq.02 below and the size of the antenna synthesized by the actual movement of the antenna is given by eq.03. Hence, the aperture of the synthesized antenna, and thus the resolution in azimuth of the system is given by Eq.04 below:

$$\theta \approx \frac{\lambda}{D} \quad \text{Eq. 02}$$

$$L_{SA} \approx 2 \cdot \sqrt{2} \cdot R \quad \text{Eq. 03}$$

$$res_{azimute} = \frac{\lambda}{2L_{SA}} \quad \text{Eq. 04}$$

Where:

θ=actual antenna aperture;

λ=wavelength of the radiated signal;

D=horizontal size of the antenna;

$L_{SA}$=distance covered by the antenna;

R=rotation radius.

ROSAR processing ends with compression in azimuth, which is similar to what is performed in compression in range, although the modulating signal is a sinusoid with linear modulation in the originated frequency due to the circular movement of the antennas, wherein this signal is the reference function. This process is used to refine the target azimuth measure, as a consequence to the ROSAR technique used.

Let us consider a system which transmits a pulse with 10 bandwidth and a signal frequency of 9.55 Ghz, with four antennas of 2.28 cm in size, rotation radius of 60 cm and rotational speed of 450 rpm. In conformity with Eq.1, we have a range resolution of:

$$res_{range} = \frac{v_{luz}}{2 * B_{pulse}} = (3*10^8)/(2*10*10^6) \approx 15 \text{ m}$$

In conformity with equation 2, the real aperture of each antenna is:

$$\theta \approx \frac{\lambda}{D} = \frac{(3*10^8)/(9.55*10^9)}{0.0228} = 78.94°$$

The equation Eq.04 reveals an aperture synthesized by:

$$res_{azimut} = \frac{\lambda}{2L_{SA}} = \frac{(3*10^8)/(9.55*10^9)}{2 \cdot \sqrt{2} \cdot 0.6} = 1.06°$$

After processing the signals with useful information, data tracked and associated with previously collected data are extracted to form a reflectivity history of the phenomenon detected. After gaining data and signals, the analysis in the time domain and frequency domain of the detected phenomena is conducted, in order to calculate the amount of reflected power, Doppler velocity and spectral spreading of the signal and thus determine the degree of wind turbulence. Subsequently, the data and information are sent to the graphic display unit, so that they can be displayed by the operator. From the frequency range of operation, the present invention is intended to analyze the characteristic effects introduced into the signal when it is reflected by a weather phenomenon and from this, it ranks it as rain, cloud, hail, etc. In combination with the technique of using pulse compression in the range the invention also achieves resolution ranges between 15 m and 50 m. In combination with the use of the ROSAR technique the present invention further achieves resolution from 0.5° to 2°, preferably 1°.

The present invention features an apparatus of antennas which operate with two types of electromagnetic wave polarization: vertical and horizontal. This makes the determination of the nature and shape of the reflecting particle possible, by means of algorithms for polarimetric analysis.

Although the invention has been described based on a specific embodiment, modifications can be implemented by persons skilled in the art, remaining within the limits of the invention, which therefore is defined by the following set of claims.

The invention claimed is:

1. A weather radar system comprising a rotating base around a vertical axis, on which at least one array of antennas is mounted, the azimuth radiation of said antenna arrays being synthesized by the ROSAR technique producing an equivalent resolution between 0.5 and 2 degrees wherein the antennas comprise waveguides whose radiating apertures are shaped as narrow vertical rectangular apertures, wherein said waveguides are radially arranged around said axis, wherein a variation of the radiation angle in elevation between 0 and 90° is provided by a support device comprising three horizontal platforms, of which at least one is vertically displaceable.

2. A weather radar system, as claimed in claim 1, wherein the radiating aperture of each antenna comprises a rectangle whose horizontal size is of the order of one wavelength and the vertical size is greater than 20 wavelengths.

3. A weather radar system as claimed in claim 1 wherein, the rotational speed of the said array is given by the expression $$v_{rpm} \geq \frac{30}{\pi} \frac{\theta}{\tau \cdot N}$$

wherein $\theta$ is the real aperture in radians of the antenna in the azimuth direction, N is the number of the receiving antennas used and $\tau$ is the decorrelation time required for the correlation to fall to 2%.

4. A weather radar system, as claimed in claim 1, wherein each said antenna array comprises a transmitting antenna and at least a receiving antenna, pair, said receiving antennas being angularly arranged.

5. A weather radar system as claimed in claim 4, wherein said transmitting antenna is positioned at the center of the angle formed by said receiving antenna pairs.

* * * * *